(12) United States Patent
Syamoto et al.

(10) Patent No.: US 7,472,621 B2
(45) Date of Patent: Jan. 6, 2009

(54) SHIFT DEVICE

(75) Inventors: Noriyasu Syamoto, Aichi (JP); Isamu Matsushima, Aichi (JP); Noriyuki Suzuki, Aichi (JP)

(73) Assignee: Kabushiki Kaisha Tokai Rika Denki Seisakusho, Ohguchi-Cho, Niwa-Gun Aichi (JP)

( * ) Notice: Subject to any disclaimer, the term of this patent is extended or adjusted under 35 U.S.C. 154(b) by 0 days.

(21) Appl. No.: 11/380,342

(22) Filed: Apr. 26, 2006

(65) Prior Publication Data

US 2006/0201272 A1 Sep. 14, 2006

Related U.S. Application Data

(62) Division of application No. 10/302,763, filed on Nov. 22, 2002, now Pat. No. 7,086,306.

(30) Foreign Application Priority Data

Nov. 22, 2001 (JP) ............................ 2001-357220
Nov. 22, 2001 (JP) ............................ 2001-357221

(51) Int. Cl.
*F16H 59/10* (2006.01)
(52) U.S. Cl. ................. 74/473.18; 74/473.33
(58) Field of Classification Search .............. 74/473.18, 74/473.32, 473.33, 473.12
See application file for complete search history.

(56) References Cited

U.S. PATENT DOCUMENTS

| 4,519,266 A | 5/1985 | Reinecke |
| 5,415,056 A | 5/1995 | Tabata et al. |
| 5,721,566 A | 2/1998 | Rosenberg et al. |
| 6,029,537 A | 2/2000 | Nagao |
| 6,128,971 A | 10/2000 | Papasideris |
| 6,144,272 A | 11/2000 | Satoh et al. |
| 6,415,677 B1 | 7/2002 | Skogward |
| 6,429,849 B1 | 8/2002 | An et al. |
| 6,530,293 B1 | 3/2003 | Ruckert et al. |
| 6,848,331 B2 | 2/2005 | Syamoto |

FOREIGN PATENT DOCUMENTS

| FR | 2737160 | 1/1997 |
| JP | 56-78406 | 6/1981 |

(Continued)

OTHER PUBLICATIONS

European Search Report for Corresponding European Application No. 02026337.2.

*Primary Examiner*—William C Joyce
(74) *Attorney, Agent, or Firm*—Sheridan Ross P.C.

(57) ABSTRACT

A shift device includes a housing, a shift lever, a sensor unit. The shift lever is moved forward and rearward, and leftward and rightward of the shift device for selecting the connection state of the transmission of a vehicle. The sensor unit is attached to the housing. The sensor unit includes a first MRE element, a second MRE element, a light sensor, a first microswitch, and a second microswitch, which are integrated. The first MRE element, the second MRE element, and the light sensor detect the position of the shift lever in the front-rear direction. The first and second microswitches detect the position of the shift lever in the left-right direction.

10 Claims, 9 Drawing Sheets

FOREIGN PATENT DOCUMENTS

| | | |
|---|---|---|
| JP | 58-73445 | 5/1983 |
| JP | 60-122402 | 6/1985 |
| JP | 5-203036 | 8/1993 |
| JP | 6-280977 | 10/1994 |
| JP | 7-6810 | 1/1995 |
| JP | 2000-16111 | 1/2000 |
| JP | 2001-134336 | 5/2001 |
| WO | 9911951 | 3/1999 |
| WO | WO 01/41053 | 6/2001 |

SHIFT DEVICE

BACKGROUND OF THE INVENTION

The present invention is related to a shift device, and more particularly to a shift device of a shift-by-wire type.

A typical shift device of the shift-by-wire type detects an operation of a shift lever by a sensor and operates an actuator that switches a connection state of a transmission according to a detection signal by the sensor. The shift device of the shift-by-wire type does not need a link mechanism for transmitting the operation of the shift lever to the transmission. Therefore, power that is necessary for operating the shift lever is relatively small. Further, the small size of the shift device adds to flexibility in the arrangement of the device in the passenger compartment.

However, if at least one sensor is arranged to correspond to each shift position of the shift lever, the number of the sensors is increased and the cost is also increased. Also, an increased number of the sensors requires relatively large space, and thus increases the size of the shift device. Particularly, if the shift device includes a fail-safe mechanism, two or more sensors must be arranged to correspond to each shift position. This further increases the cost and size of the shift device.

SUMMARY OF THE INVENTION

The objective of the present invention is to provide a compact and low-cost shift device.

To achieve the above objective, the present invention provides a shift device. The shift device includes a housing, a shift member, and a sensor unit. The shift member extends from the housing. The shift member is moved in a first direction and a second direction for selecting the connection state of the transmission of a vehicle, the first and second directions intersecting each other. The sensor unit is attached to the housing. The sensor unit is formed by integrating a first detection device and a second detection device. The first detection device detects the position of the shift member in the first direction. The second detection device detects the position of the shift member in the second direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention will now be described with reference to FIGS. 1(a) to 5. In this embodiment, a frontward direction, a rearward direction, a leftward direction and a rightward direction of a shift device 11 are defined as shown in FIG. 2.

Figure 2:
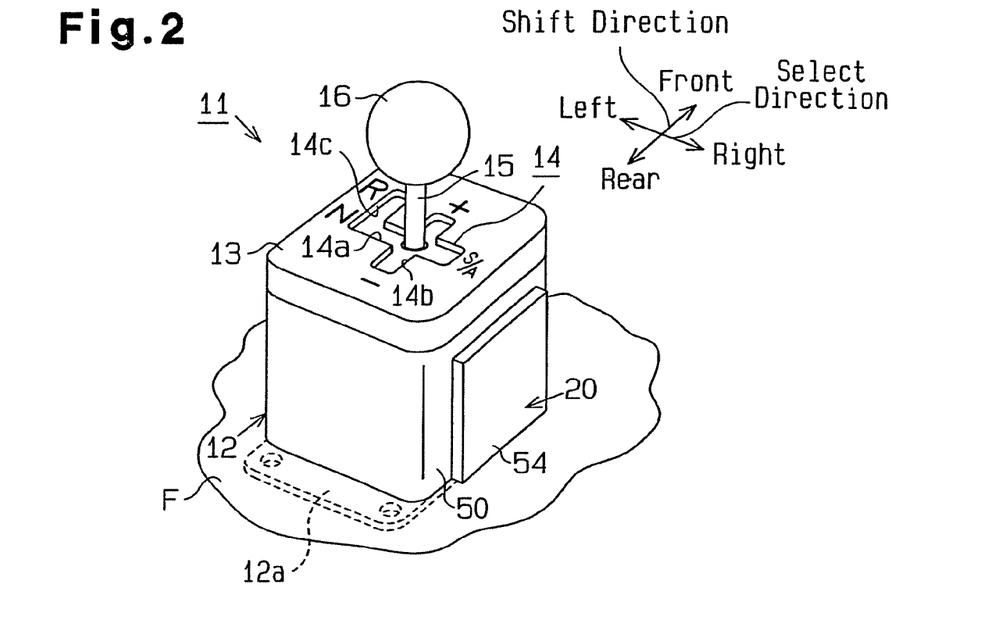
FIG. 2 is a perspective view showing the shift device of FIG. 1.

As shown in FIG. 2, the shift device 11 has a housing 12 of a box shape. The housing 12 is fixed to a floor console F of a vehicle via a flange 12a that is arranged at a bottom end of the housing 12. An upper portion of the housing 12 is covered with a cover plate 13. A shift gate 14 is formed in the cover plate 13. A shift member, which is a shift lever 15 in this embodiment, is extended upward from the shift gate 14. A spherical knob 16 is provided on an upper end of the shift lever 15.

The shift gate 14 includes a first gate 14a extending along the left-right direction, a second gate 14b extending from an intermediate portion of the first gate 14a along a front-rear direction and a third gate 14c extending frontward from the left end of the first gate 14a. The shift lever 15 moves along the shift gate 14 and a connection state of a transmission (not shown) is switched according to the movement of the shift lever 15.

When the shift lever 15 is moved to the intersection of the first gate 14a and the third gate 14c, or an N position, the transmission is shifted to neutral. When the shift lever 15 is moved from the N position to the right end of the first gate 14a, or an S/A position, the transmission is switched to an automatic transmission mode. At this time, if the driver releases the shift lever 15, the shift lever 15 moves from the S/A position to the intersection of the first gate 14a and the second gate 14b, or an S position. If the shift lever 15 is moved to the S/A position again after being moved from the S/A position to the S position, the transmission is switched a sequential mode (manual mode). At this time, if the driver releases the shift lever 15, the shift lever 15 moves from the S/A position to the S position. If the shift lever 15 is moved to the front end of the second gate 14b, or a + position, when the transmission is in the sequential mode, the transmission is shifted to the next higher gear. If the shift lever 15 is moved to the rear end of the second gate 14b, or a − position, when the transmission is in the sequential mode, the transmission is shifted to the next lower gear. If the driver releases the shift lever 15 when the shift lever 15 is at the + position or the − position, the shift lever 15 returns to the S position from the + position or the − position. On the other hand, if the shift lever 15 is moved to the front end of the third gate 14c, or an R position, the transmission is shifted to reverse.

When the shift lever 15 is at the N position, the S position or the R position, the shift lever 15 remains at the position even if the driver releases the shift lever 15.

Figures 1A, 1B:
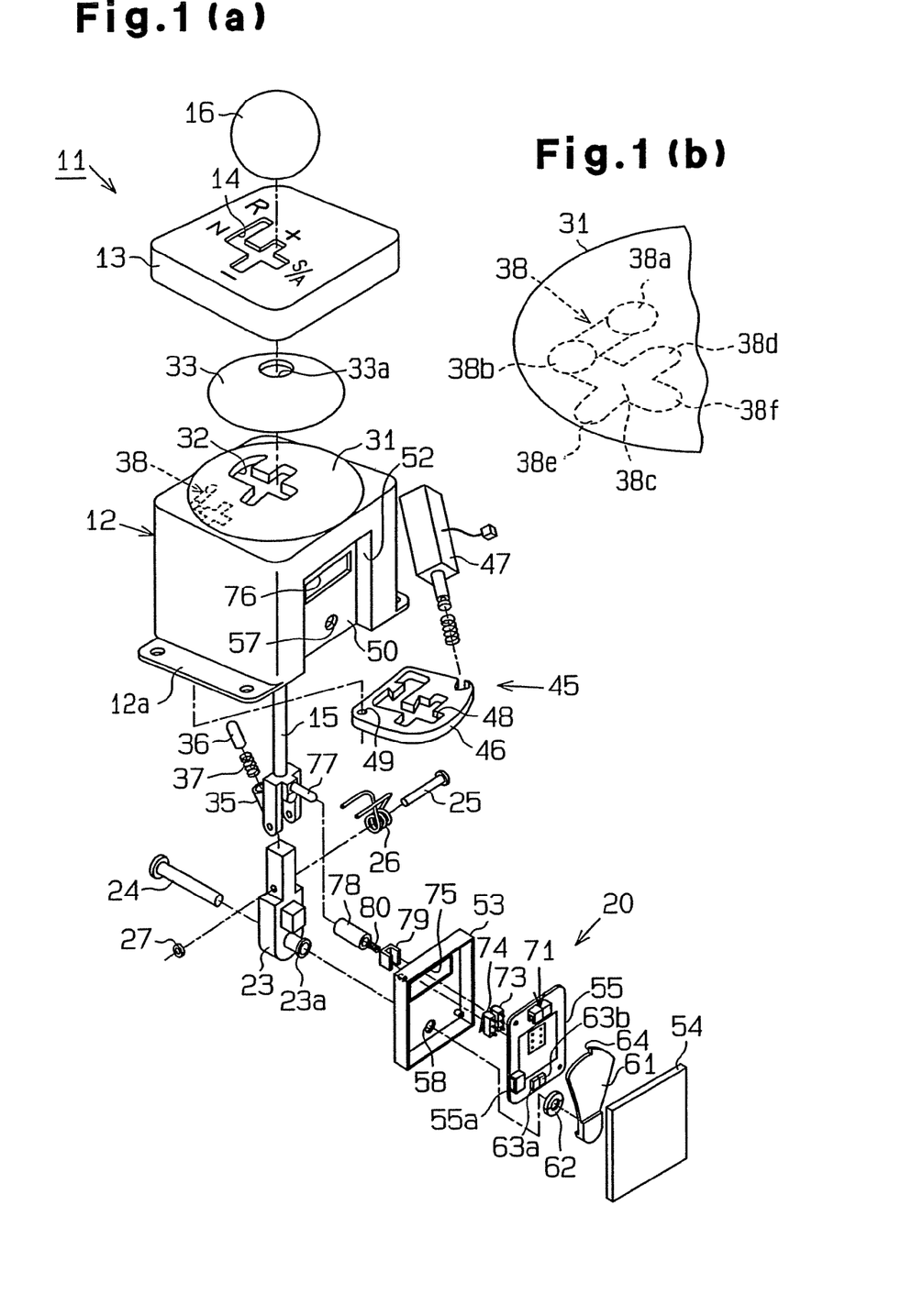
FIG. 1(a) is an exploded perspective view showing a shift device according to a first embodiment of the present invention.
FIG. 1(b) is a perspective view showing an enlarged detent groove arranged in the shift device of FIG. 1.

As shown in FIG. 1(a), the shift device 11 has a first rotation member, which is a shaft 24 in this embodiment. The shaft 24 is rotatably supported by the housing 12 and extends along the left-right direction. A retainer 23 is supported by the shaft 24 to rotate integrally with the shaft 24. The shift lever 15 is supported by the retainer 23 with a pin 25 so as to be inclined in the left-right direction (a select direction) and supported by the housing 12 so as to be inclined in a front-rear direction (a shift direction) via the retainer 23 and the shaft 24. A stop ring 27 prevents the pin 25 from being loosened. A torsion spring 26 is engaged to a shaft portion of the pin 25. The torsion spring 26 urges the shift lever 15 toward the S position when the shift lever 15 is in the S/A position. A cylindrical portion 23a that surrounds a part of the shaft 24 is formed on the retainer 23.

A dome portion 31 is formed on an upper surface of the housing 12. A gate 32 that has a same shape as the shift gate 14 is formed in the dome portion 31. A dome-shaped slide cover 33 is provided between the dome portion 31 and the cover plate 13. A through hole 33a is formed at a center of the slide cover 33. The shift lever 15 is inserted in the gate 32 and the through hole 33a. The slide cover 33 slides on the dome portion 31 in synchronism with the movement of the shift lever 15 and always covers the gate 32.

A pin accommodation recess 35 that extends toward a slanted upper direction is formed at the lower portion of the shift lever 15. A detent pin 36 and a spring 37 that urges the detent pin 36 toward the slanted upper direction are accommodated in the pin accommodation recess 35. As shown in FIG. 1(b), a detent groove 38 that has an almost same shape as the shift gate 14 is formed on a rear surface of the dome portion 31.

The detent groove 38 includes first to sixth sections 38a to 38f. The first section 38a engages with the detent pin 36 when the shift lever 15 is at the R position. The second section 38b engages with the detent pin 36 when the shift lever 15 is at the N position. The third section 38c engages with the detent pine 36 when the shift lever 15 is at the S position. The fourth section 38d engages with the detent pin 36 when the shift lever 15 is at the + position. The fifth section 38e engages with the detent pin 36 when the shift lever 15 is at the − position. The sixth section 38f engages with the detent pin 36 when the shift lever 15 is at the S/A position.

The first section 38a is deeper than the section of the detent groove 38 that connects the first section 38a with the second section 38b. Therefore, when the shift lever 15 is at the R position, the shift lever 15 remains at the R position even if the driver releases the lever 15. The second section 38b is deeper than the sections of the detent groove 38 that connect the second section 38b with the first section 38a and the third section 38c. Therefore, when the shift lever 15 is at the N position, the shift lever 15 remains at the N position even if the driver releases the lever 15. The third section 38c is deeper than the sections of the detent groove 38 that connect the third section 38c with second section 38b, the fourth section 38d, the fifth section 38e, and the sixth section 38f. Therefore, when the shift lever 15 is at the S position, the shift lever 15 remains at the S position even if the driver releases the lever 15. The depth of the detent groove 38 increases from the fourth section 38d, the fifth section 38e, the sixth section 38f toward the third section 38c. Therefore, if the driver releases the shift lever 15 when the shift lever 15 is at the + position, − position or the S/A position, the shift lever 15 is urged by the spring 37 and returns to the S position. When returning from the S/A position to the S position, the shift lever 15 is also urged by the torsion spring 26.

As shown in FIG. 1(a), a shift lock device 45 is accommodated in the housing 12. The shift lock device 45 has a stopper plate 46 and a suction solenoid 47. A stopper gate 48 of a predetermined shape that allows the shift lever 15 to be penetrated is formed in the stopper plate 46. A hole 49 is formed on a peripheral portion of the stopper plate 46. The stopper plate 46 is supported by the housing 12 so as to be rotated in a horizontal plane around the hole 49. The suction solenoid 47 moves the stopper plate 46 to a lock position where the shift lever 15 cannot be moved in the shift direction and the select direction when an ignition switch of the vehicle is off. The suction solenoid 47 moves the stopper plate 46 to a release position where the shift lever 15 can be moved in the shift direction and the select direction when the ignition switch is on. In this embodiment, if the ignition switch is turned off when the shift lever 15 is in the R position, the stopper plate 46 moves in the lock position so that the shift lever 15 cannot be operated.

As shown in FIGS. 1(a) and 2, a sensor unit 20 is arranged on the outer surface of a right side wall 50 of the housing 12. The sensor unit 20 is formed in a flat square box. As shown in FIG. 1(a), an arrangement recess 52 where the sensor unit 20 is arranged is formed on the right side wall 50. The sensor unit 20 is arranged on the housing 12 so that a part of the sensor unit 20 is accommodated in the arrangement recess 52. In this embodiment, the outer surface of the right side wall 50 is a mounting surface to which the sensor unit 20 is mounted.

Figure 3:
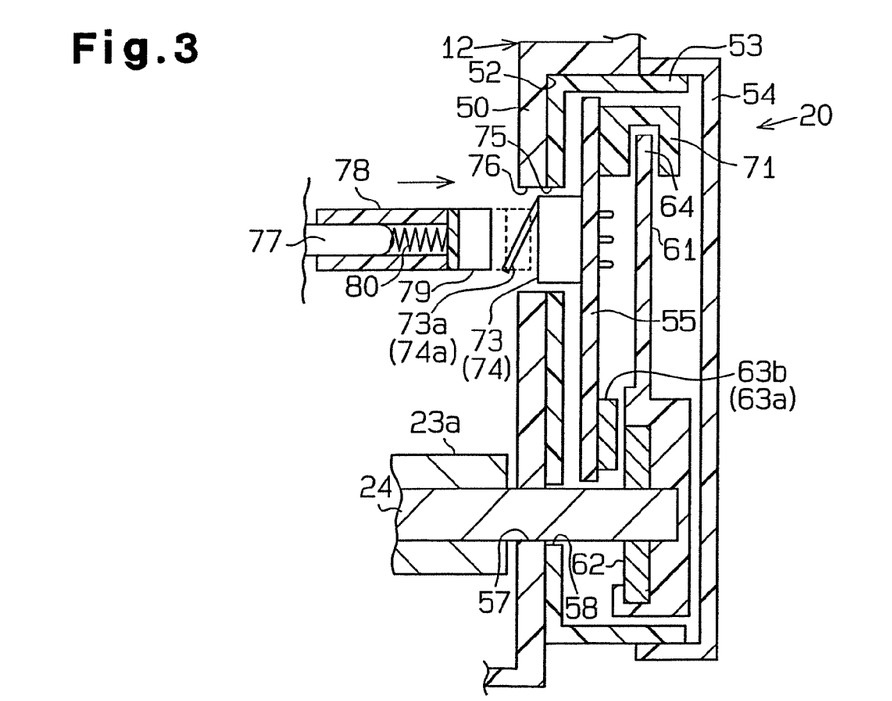
FIG. 3 is a cross-sectional view showing the periphery of a sensor unit arranged in the shift device of FIG. 1.
Figure 4:
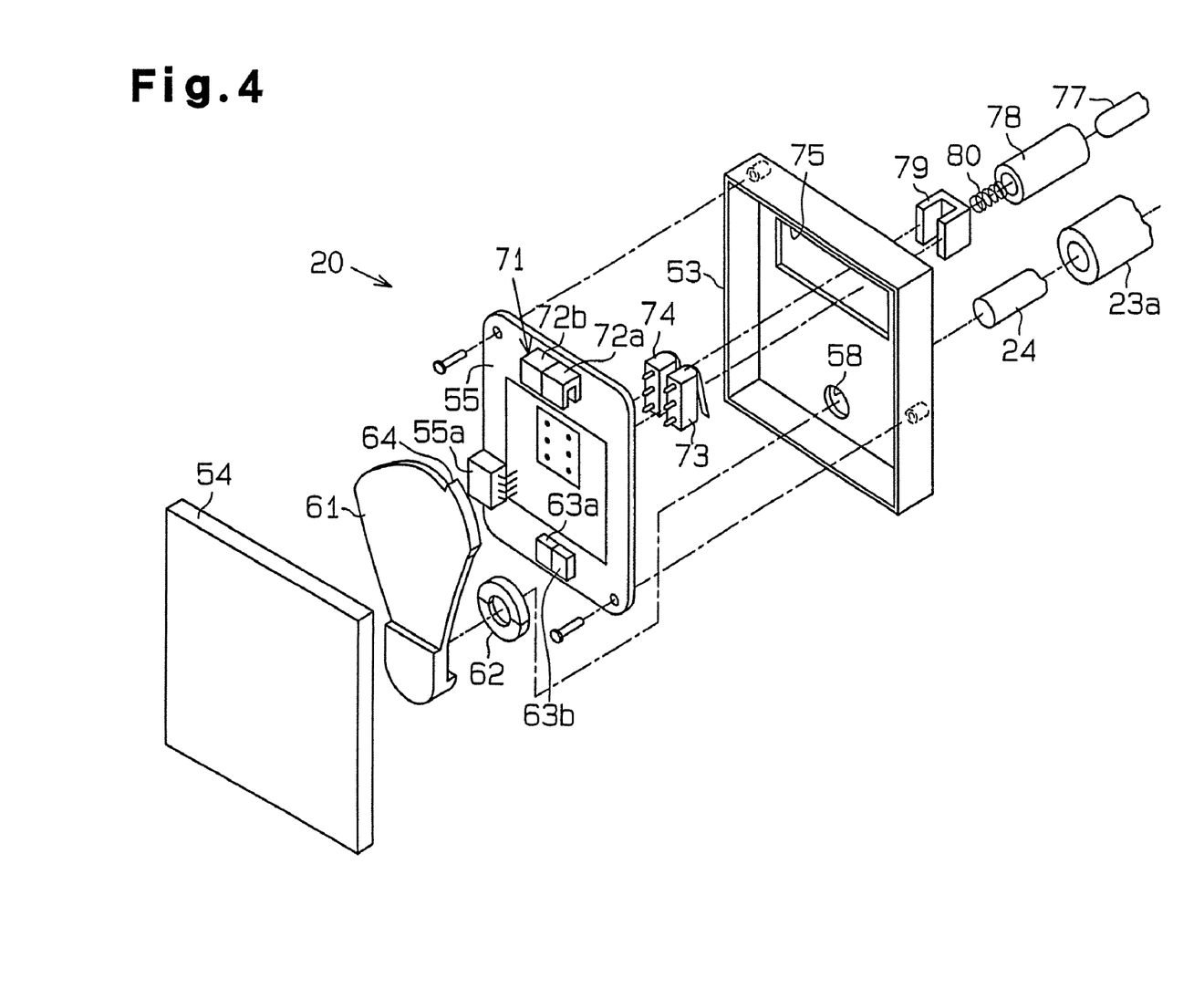
FIG. 4 is an exploded perspective view showing an internal structure of the sensor unit of FIG. 3.

As shown in FIGS. 1(a), 3 and 4, the sensor unit 20 has a case 53 and a cover plate 54. The case 53 has an opening, and the cover plate 54 covers the opening of the case 53. A part of the case 53 is accommodated in the arrangement recess 52. A PC board 55, a sectorial plate 61 is accommodated in the case 53. The PC board is fixed to the case 53. A connector 55a is provided on the PC board 55. An electronic control unit 110 (ECU 110) that is mounted in the vehicle is connected to the connector 55a (see FIG. 5).

A through hole 57 is formed in the lower portion of the right side wall 50 of the housing 12. A through hole 58 is formed in the lower portion of the case 53. The through holes 57, 58 are coaxial. The shaft 24 is extended to the cover plate 54 through the through holes 57, 58. The sectorial plate 61 is arranged on the distal end of the shaft 24. A magnet 62 of a ring shape is arranged on a lower portion of the sectorial plate 61. The shaft 24 is penetrated through the magnet 62. The magnet 62 is polarized so that its polarity is changed in its peripheral direction. The sectorial plate 61 and the magnet 62 are rotated in synchronism with the shaft 24.

A first MRE element 63a (magneto-resistive effect elements) and a second MRE element 63b are located on a part of the PC board 55 that faces the upper portion of the magnet 62. The MRE elements 63a, 63b are arranged in the front-rear direction of the shift device 11 for detecting the position of the shift lever 15 in the shift direction. Each of the MRE elements 63a, 63b is electrically connected to the connector 55a and detects a change of the magnetic flux caused by the synchronous rotation of the magnet 62 with the shaft 24 and outputs three kinds of signals V1, V2, V3 corresponding to the detected magnetic flux. The signals V1 to V3 each have a different level. That is, when the shift lever 15 is in the R position or the + position the MRE element 63a, 63b outputs a signal V1, and when the shift lever 15 is in one of the N position, the S position and the S/A position the MRE element 63a, 63b outputs a signal V2, and when the sift lever 15 is in the − position the MRE element 63a, 63b outputs a signal V3.

A shielding portion 64 is extended upward from a part of the upper end of the sectorial plate 61. A light sensor 71 is arranged on a portion of the PC board 55 corresponding to the upper portion of the sectorial plate 61. The light sensor 71 detects the position of the shift lever 15 in the shift direction. The light sensor 71 includes a first photo-interrupter 72a and a second photo-interrupter 72b that are aligned in the front-rear direction of the shift device 11 (see FIG. 4). Each of the photo-interrupters 72a, 72b is electrically connected to the connector 55a. A light emission portion and a light receiving portion are provided in each photo-interrupter 72a, 72b so as to be faced with each other. When the shaft 24 is rotated according to the movement of the shift lever 15 in the shift direction, the shielding portion 64 moves in the front-rear direction of the shift device 11 between the light emission portion and the light receiving portion of each photo-interrupter 72a, 72b. Light emitted from the light emission portion of each photo-interrupter 72a, 72b is prevented from reaching the light receiving portion or allowed to reach the light receiving portion. When the shift lever 15 is in the R position or the + position, the light receiving portions of both photo-interrupters 72a, 72b detect light emitted from the light emission portions. When the shift lever 15 is in one of the N position, the S position and the S/A position, only the light receiving portion of the second photo-interrupter 72b detects light emitted from the light emission portion. When the shift lever 15 is in the − position, the light receiving portions of the photo-interrupters 72a, 72b do not detect a light emitted from the light emission portions. Each of the photo-interrupter 72a, 72b outputs two kinds of signals W1, W2, which have different levels, in accordance with the detection of light at the light receiving portion.

In this embodiment, the first MRE element 63a, the second MRE element 63b, and the light sensor 71 form a first detection device, which detects the position of the shift lever 15 in the shift direction.

Figure 5:
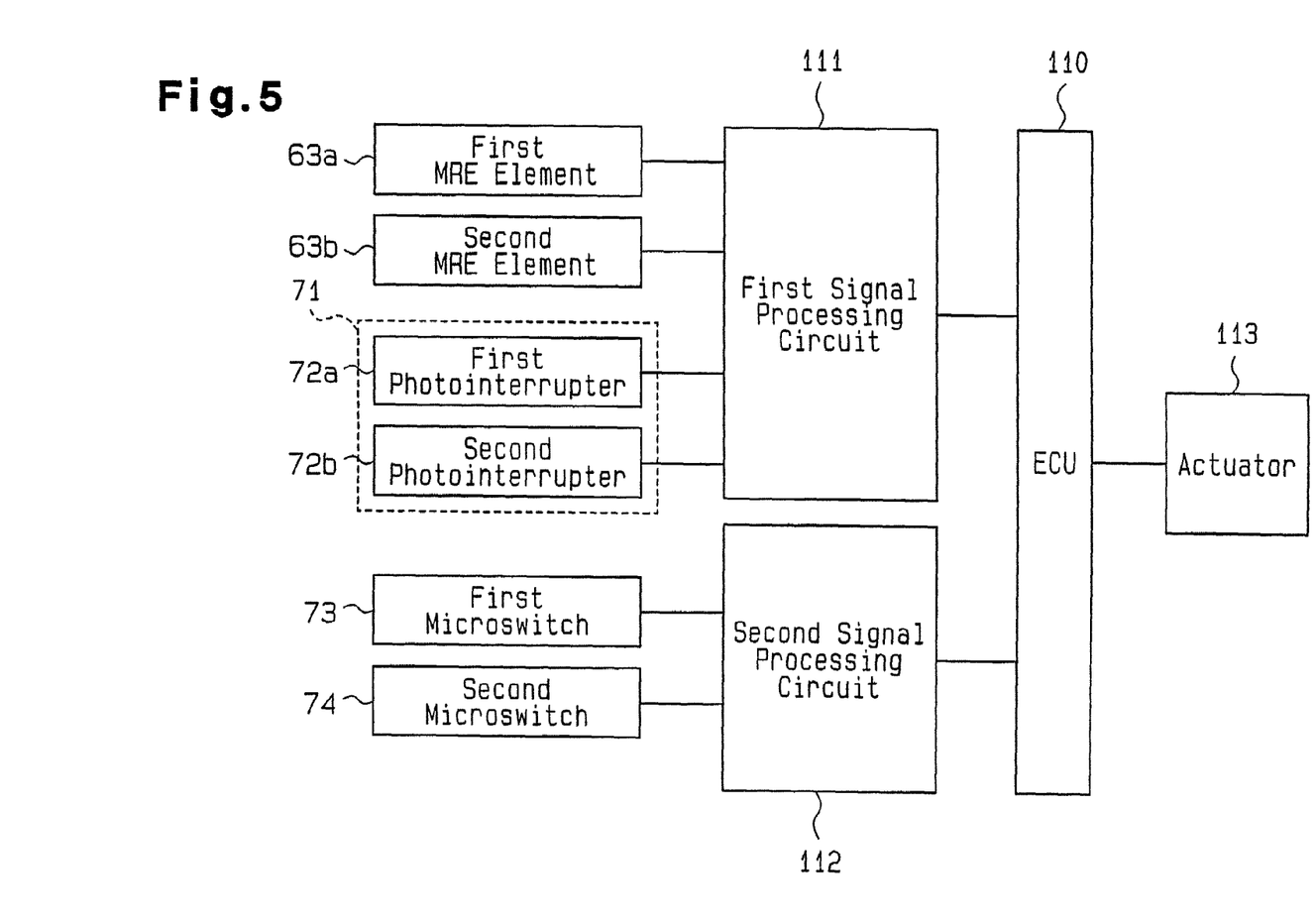
FIG. 5 is a circuit diagram showing paths of signals from the sensor unit to the actuator in the shift device shown in FIG. 1.

As shown in FIG. 5, the output signals V1 to V3 of the first MRE element 63a, the output signals V1 to V3 of the second MRE element 63b, the output signals W1, W2 of the first photo-interrupter 72a, and the output signals W1, W2 of the second photo-interrupter 72b are transmitted to a first signal processing circuit 111 having an OR circuit. The first signal processing circuit 111 processes the received signals. The process includes a logical OR operation. The first signal processing circuit 111 outputs the processed result to the ECU 110.

The PC board 55 further has first and second microswitches 73, 74, which are arranged in the front-rear direction of the shift device 11. The microswitches 73, 74 detect the position of the shift lever 15 in the select direction. A lever 73a, 74a is extended in a slanted direction from each microswitch 73, 74. Each microswitch 73, 74 is electrically connected to the connector 55a. When the lever 73a, 74a is depressed halfway, each microswitch 73, 74 outputs a signal X1. When the lever 73a, 74a is depressed completely, each microswitch 73, 74 outputs a signal X2. When the lever 73a, 74a is not depressed at all, neither signal X1 nor X2 is output.

A rectangular through hole 75 is formed in the upper portion of the right side wall 50 of the housing 12. A rectangular through hole 76 is formed in the upper portion of the case 53. The through holes 75, 76 face each other. The microswitches 73, 74 are inserted in the through holes 75, 76. A moving member, which is a projection 77 in this embodiment, is formed on the shift lever 15 so as to extend between the microswitches 73, 74. The distal end portion of the projection 77 is fitted into a cylindrical body 78. A switch connection piece 79 whose cross section is almost U-shape is arranged on the distal end of the cylindrical body 78. The switch connection piece 79 faces the microswitches 73, 74 so as to depress the levers 73a, 74a of the microswitches 73, 74. A spring 80 is supported between the projection 77 and the switch connection piece 79 by the cylindrical body 78. The spring 80 absorbs shock that is caused when the switch connection piece 79 depresses the levers 73a, 74a. That is, the spring 80 prevents that excessive load is applied to the microswitches 73, 74 by over stroke of the projection 77.

Since the levers 73a, 74a of the microswitches 73, 74 are depressed halfway by the switch connection piece 79 when the shift lever 15 is in the S position, each microswitch 73, 74 outputs the signal X1. Since the levers 73a, 74a of the microswitches are depressed completely by the switch connection piece 79 when the shift lever 15 is in the S/A position, each microswitch 73, 74 outputs the signal X2. Since the switch connection piece 79 does not depress either lever 73a, 74a of the microswitch 73, 74 when the shift lever 15 is in one of the + position, the − position, the N position and the R position, each of the microswitches 73, 74 does not output the signals X1, X2.

In this embodiment, the first microswitch 73 and the second microswitch 74 form a second detection device, which detects the position of the shift lever 15 in the select direction.

As shown in FIG. 5, the output signals X1, X2 of the first microswitch 73 and the output signals X1, X2 of the second microswitch 74 are transmitted to a second signal processing circuit 112 having an OR circuit. The second signal processing circuit 112 processes the received signals. The process includes a logical OR operation. The second signal processing circuit 112 outputs the processed result to the ECU 110.

The ECU 110 recognizes the position of the shift lever 15 based on the output signals of the first and second signal processing circuits 111, 112. Accordingly, the ECU 110 operates an actuator 113 for switching the connection state of the transmission.

When the shift lever 15 is moved to the R position, the signal V1 is output from the MRE elements 63a, 63b and the signal W1 is output from the photo-interrupter 72a, 72b, and neither signal X1 nor X2 is output from the microswitches 73, 74. The ECU 110 recognizes that the shift lever 15 is in the R position based on the signals and the present connection state of the transmission (neutral range) and switches the connection state of the transmission to the reverse range via the actuator 113.

When the shift lever 15 is moved to the N position, the signal V2 is output from the MRE elements 63a, 63b and the signal W2 is output from the photo-interrupters 72a, 72b, and neither signal X1 nor X2 is output from the microswitches 73, 74. As a result, the ECU 110 recognizes that the shift lever 15 is in the N position and switches the connection state of the transmission to the neutral range via the actuator 113.

When the shift lever 15 is moved to the S position, the signal V2 is output from the MRE elements 63a, 63b, the signal W2 is output from the photo-interrupters 72a, 72b, and the signal X1 is output from the microswitches 73, 74. As a result, the ECU 110 recognizes that the shift lever 15 is in the S position. At this time, when the present connection state of the transmission is in the neutral range, the ECU 110 switches the connection state of the transmission to the sequential mode via the actuator 113. When the present connection state of the transmission is in the sequential mode or the automatic transmission mode, the ECU 110 maintains the present connection state.

When the shift lever 15 is moved to the S/A position, the signal V2 is output from the MRE elements 63a, 63b, the signal W2 is output from the photo-interrupters 72a, 72b, and the signal X2 is output from the microswitches 73, 74. As a result, the ECU 110 recognizes that the shift lever 15 is in the S/A position. At this time, when the present connection state of the transmission is in the automatic transmission mode, the ECU 110 switches the connection state of the transmission to the sequential mode via the actuator 113. When the present connection state of the transmission is in the sequential mode, the ECU 110 switches the connection state of the transmission to the automatic transmission mode via the actuator 113.

When the shift lever 15 is moved to the + position, the signal V1 is output from the MRE elements 63a, 63b, the signal W1 is output from the photo-interrupter 72a, 72b, and neither signal X1 nor X2 is output from the microswitches 73, 74. The ECU 110 recognizes that the shift lever 15 is in the + position based on the signals and the present connection state of the transmission (the automatic transmission mode or the sequential mode). At this time, when the present connection state of the transmission is in the sequential mode, the ECU 110 shifts the transmission to the next higher gear via the actuator 113. However, when the present connection state of the transmission is in the automatic transmission mode, the ECU 110 judges that the signals output from the first and second signal processing circuits 111, 112 are invalid and maintains the present connection state.

When the shift lever 15 is moved to the − position, the signal V3 is output from the MRE elements 63a, 63b, the signal W3 is output from the photo-interrupters 72a, 72b, and neither signal X1 nor X2 is output from the microswitches 73, 74. As a result, the ECU 110 recognizes that the shift lever 15 is in the − position. At this time, when the present connection state of the transmission is in the sequential mode, the ECU 110 shifts the transmission to the next lower gear via the actuator 113. However, when the present connection state of the transmission is in the automatic transmission mode, the ECU 110 judges that the signals output from the first and second signal processing circuits 111, 112 are invalid and maintains the present connection state.

According to the first embodiment, the following advantages can be obtained.

The sensors for detecting the position of the shift lever 15, that are the MRE elements 63a, 63b, the light sensor 71 and the microswitches 73, 74 are unified as the sensor unit 20. Therefore, the structure for detecting the position of the shift lever 15 becomes small in size and the shift device 11 becomes small in size. Since the number of the sensors can be decreased compared to the case where a sensor is arranged on each shift position of the shift lever 15, the shift device 11 becomes inexpensive.

The shift device 11 has the first MRE element 63a, the second MRE element 63b and the light sensor 71 as a sensor for detecting the position of the shift lever 15 in the shift direction. Therefore, even if any one of the three sensors malfunctions, the position of the shift lever 15 in the shift direction can be detected by the other sensors.

The shift device 11 has the first microswitch 73 and the second microswitch 74 as a sensor for detecting the position of the shift lever 15 in the select direction. Therefore, even if one of the two sensors malfunctions, the position of the shift lever 15 in the select direction can be detected by the other sensor.

Since the MRE elements 63a, 63b and the light sensor 71 are non-contact sensors, their durability is excellent.

Since the sensor unit 20 is arranged outside of the housing 12, the maintenance and the replacement of the sensors can be executed simply compared to the case where the sensor unit 20 is arranged inside of the housing 12.

Next, a second embodiment of the present invention will be explained with reference to FIGS. 6 to 11. In this second embodiment, the front direction, the rear direction, the right direction and the left direction of the shift device 11 are defined as shown in FIG. 7. The shift device 11 of the second embodiment includes common components to the shift device 11 of the first embodiment. The same numerals are applied to the common components and the explanation thereof is omitted.

Figure 6:
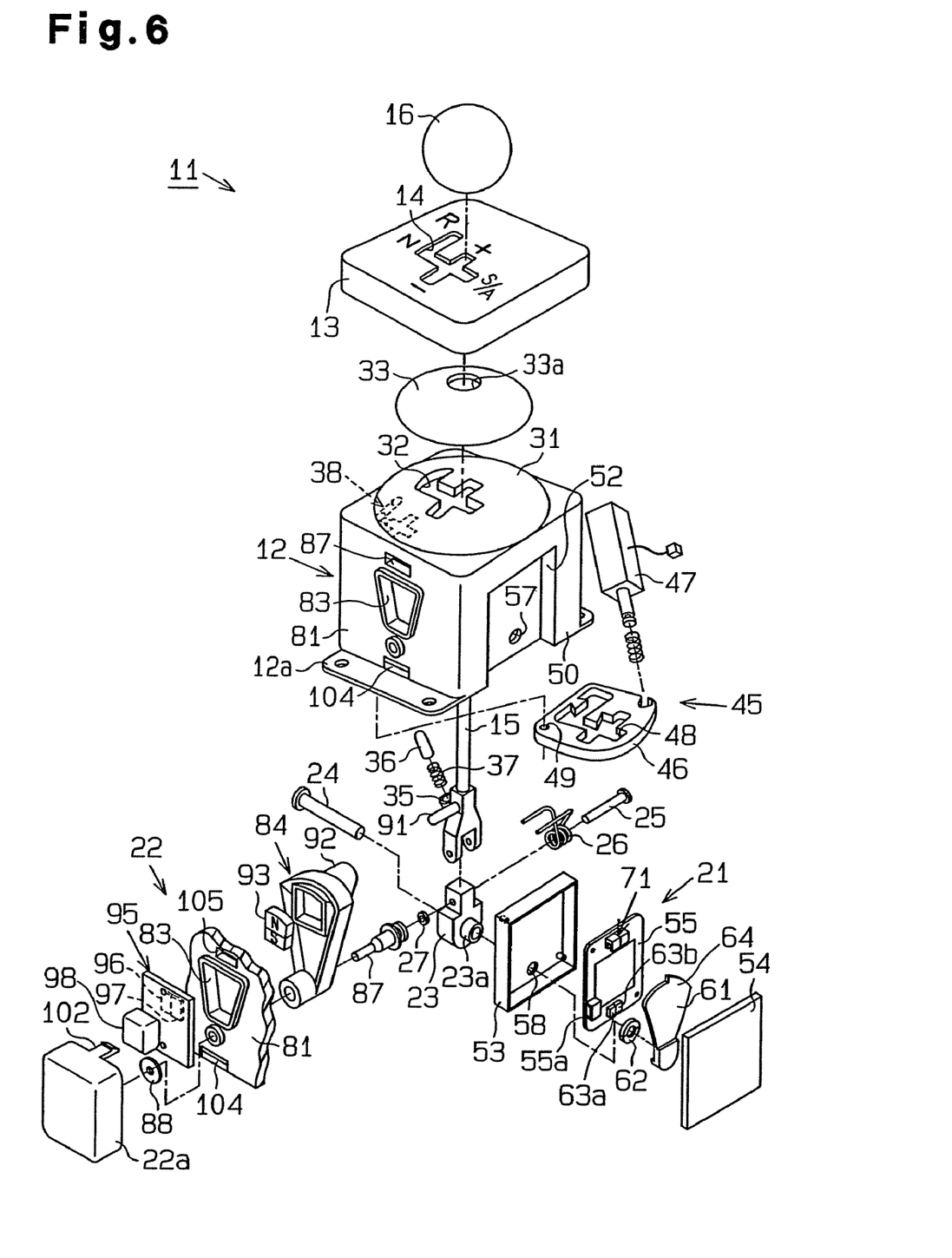
FIG. 6 is an exploded perspective view showing a shift device according to a second embodiment of the present invention.
Figure 7:
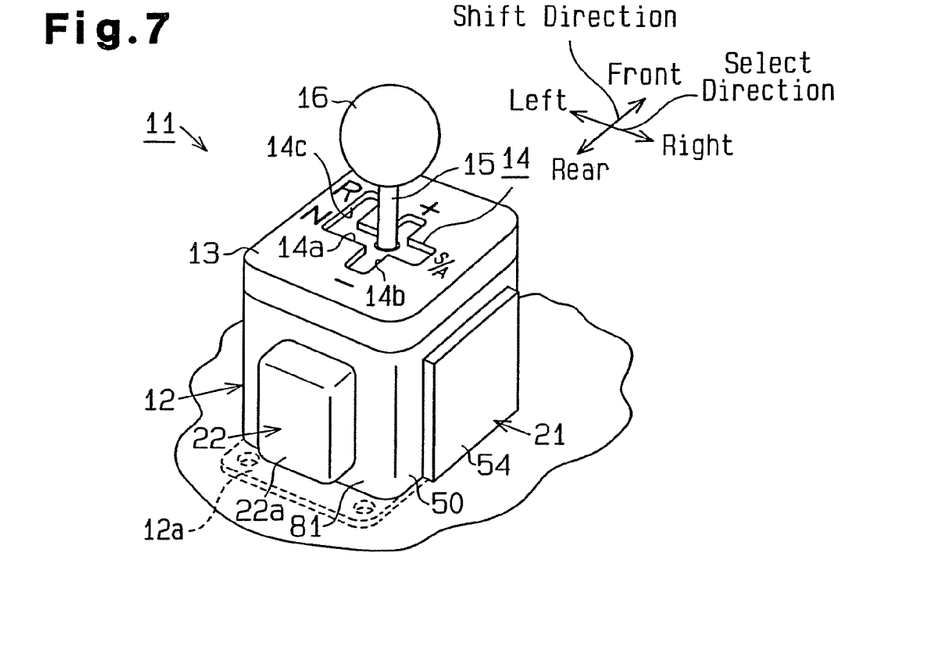
FIG. 7 is a perspective view of the shift device of FIG. 6.

As shown in FIGS. 6 and 7, the shift device 11 of the second embodiment has a first sensor unit 21 and a second sensor unit 22 instead of the sensor unit 20. The first sensor unit 21 is arranged on the outer surface of the right side wall 50 of the housing 12 and the second sensor unit 22 is arranged on the outer surface of a rear wall 81 of the housing 12. In this embodiment, the outer surface of the right side wall 50 is a first mounting surface, on which the first sensor unit 21 is mounted. The outer surface of he rear wall 81 is a second mounting surface, on which the second sensor unit 22 is mounted.

Figure 8:
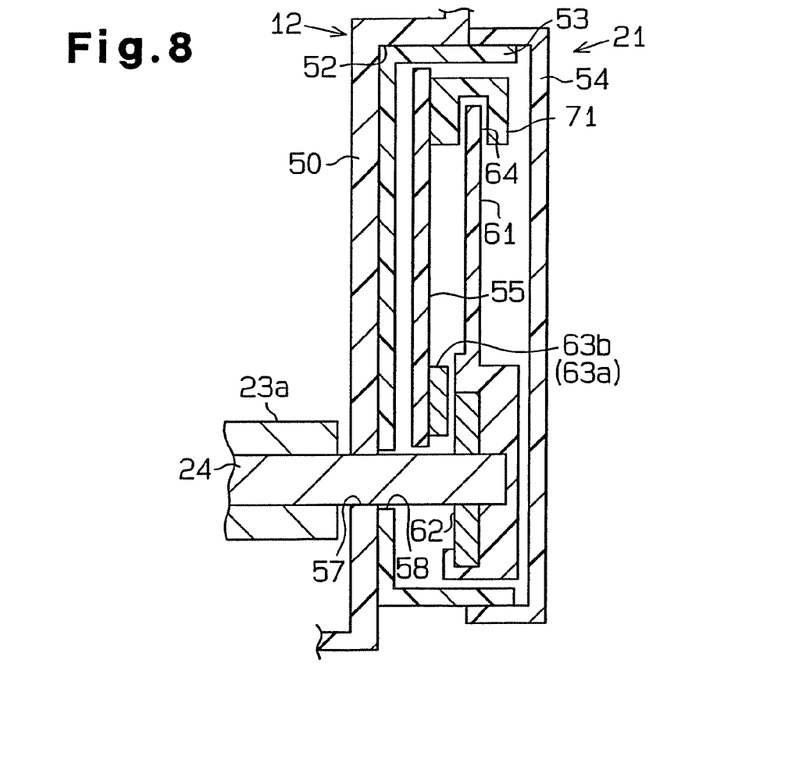
FIG. 8 is a cross-sectional view showing the periphery of a first sensor unit arranged in the shift device of FIG. 6.

As shown in FIGS. 6 and 8, the first sensor unit 21 has almost the same structure as the sensor unit 20 of the first embodiment except that the first sensor unit 21 does not have the microswitches 73, 74.

Figures 9A, 9B:
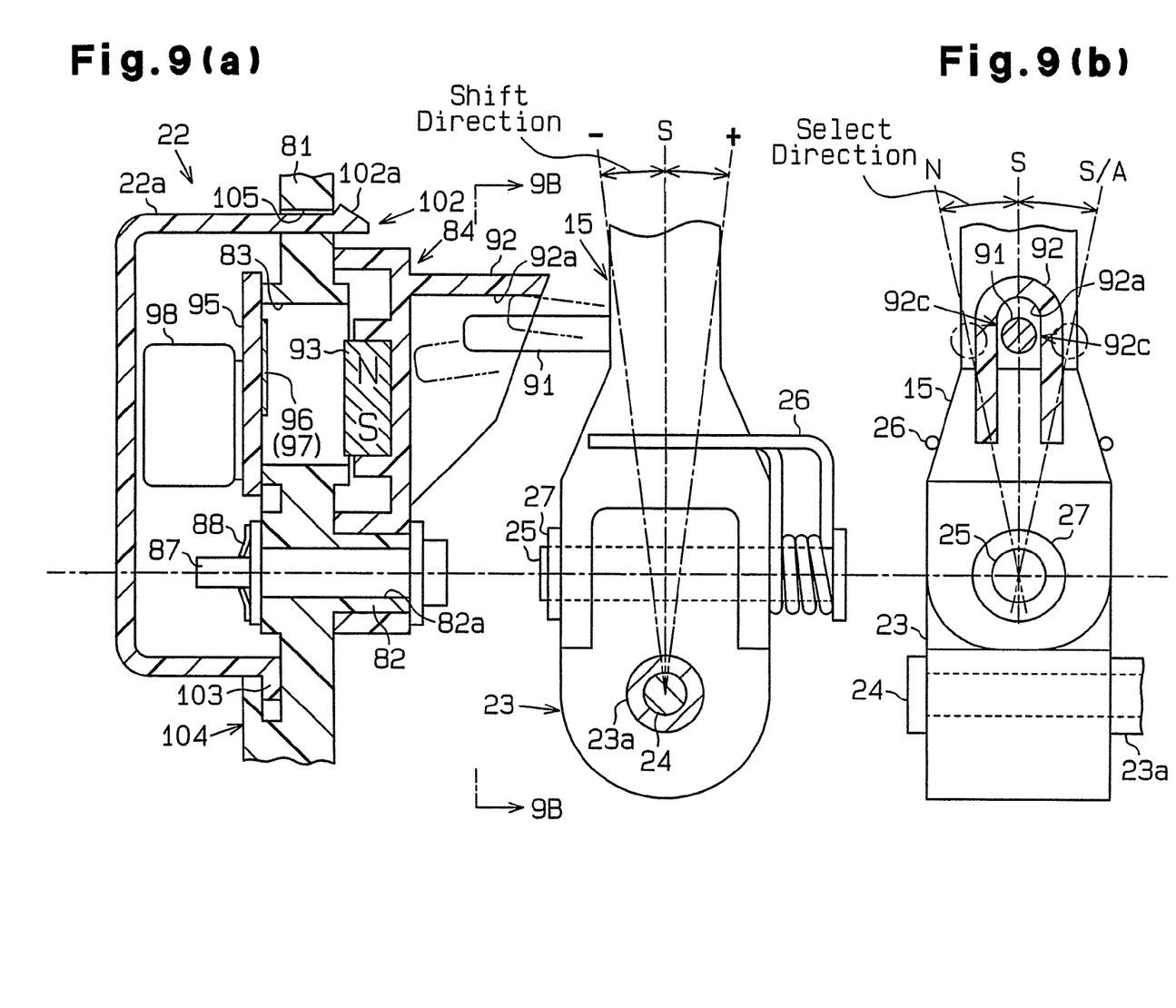
FIG. 9(a) is a cross-sectional view showing the periphery of a second sensor unit arranged in the shift device of FIG. 6.
FIG. 9(b) is a cross-sectional view that is taken along a 9B-9B line in FIG. 9(a)
Figure 10:
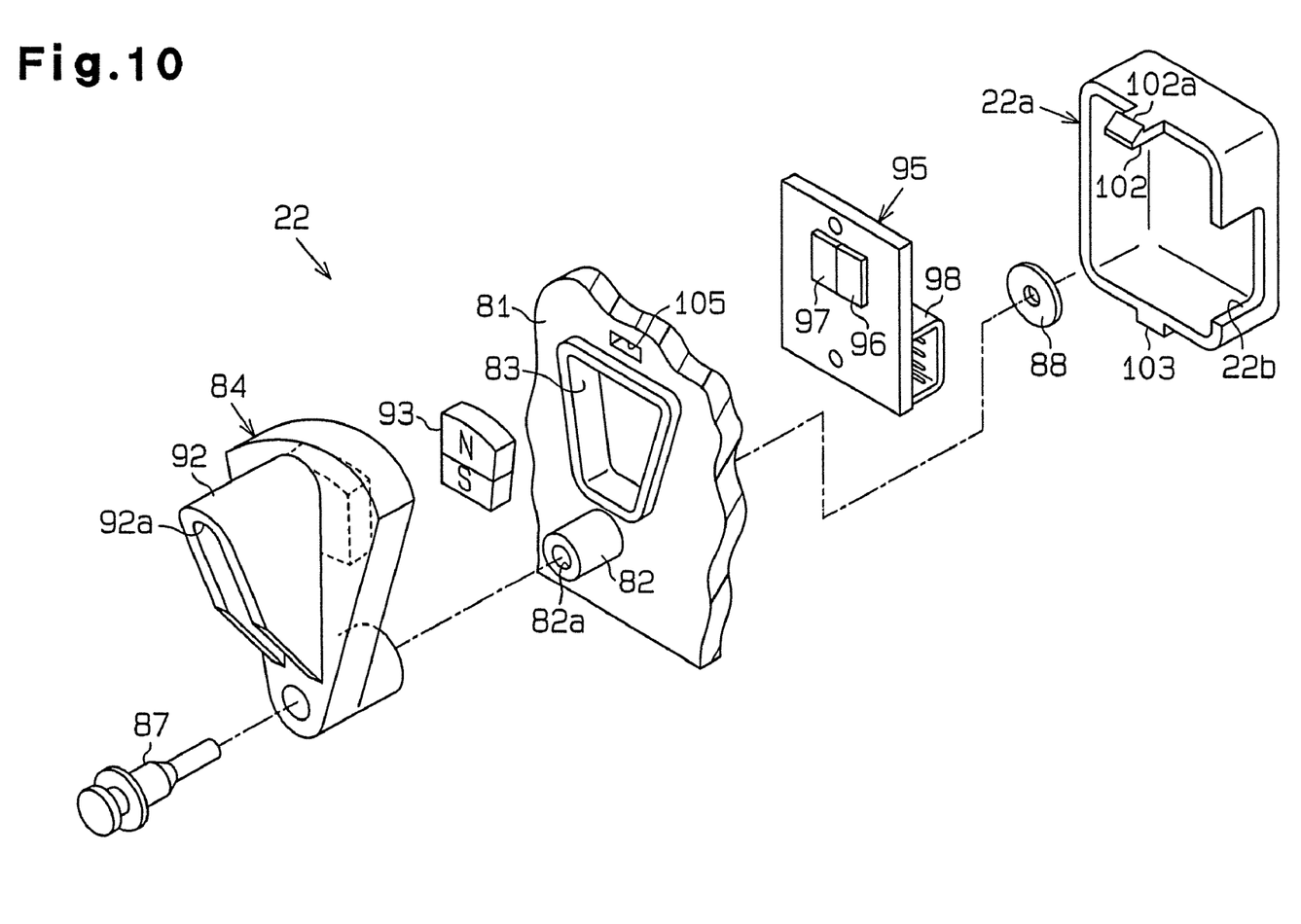
FIG. 10 is an exploded perspective view of the inner structure of the second sensor unit arranged in the shift device of FIG. 6.

As shown in FIGS. 6, 9(a) and 10, the second sensor unit 22 has a sensor cover 22a of a rectangular box that is open frontward. A snap fit portion 102 having an engaging portion 102a at its distal end is extended from the upper portion of the sensor cover 22a. An engaging projection portion 103 is formed at the lower portion of the sensor cover 22a. A through hole 105 and an engaging portion 104 are formed on the rear wall 81 of the housing 12. The through hole 105 allows the snap fit portion 102 to be penetrated therein and the engaging portion 104 has a recess portion that is engaged to the engaging projection portion 103. After the engaging projection portion is engaged to the engaging portion 104, the snap fit portion 102 is penetrated through the through hole 105 to engage the engaging portion 102a to the inner surface of the rear wall 81. Accordingly, the sensor cover 22a is arranged to the rear wall 81. The PC board 95 is accommodated in the sensor cover 22a.

A boss portion 82 is extended frontward from the lower portion of the rear wall 81 of the housing 12. The boss portion 82 has a through hole 82a extending along its axial direction. A second rotation member, which is a sectorial plate 84, is rotatably arranged to the boss portion 82 by a pin 87 that is penetrated through the through hole 82a. Accordingly, the sectorial plate 84 can be tilted in the left-right direction. A stop ring 88 prevents the pin 87 from being loosened. The axial line of the pin 87 is positioned on the extended line of the axial line of the pin 25 when the shift lever 15 is in the S position. That is, the rotational axis of the sectorial plate 84 is coincident with the tilting axis of the shift lever 15 in the select direction.

As shown in FIGS. 6, 9(a) and 9(b), a projection 91, is extended rearward from the lower portion of the shift lever 15. The projection 91 is positioned upward from the pin 25. An engaging portion 92 having an upside-down U-shaped cross section is formed on the sectorial plate 84. The projection 91 is positioned within a recess portion 92a surrounded by the engaging portion 92. Therefore, the sectorial plate 84 is tilted in the left-right direction according to the tilting movement of the shift lever 15 in the select direction. As shown in FIG. 9(a), when the shift lever 15 is in the + position or the R position, that is, even when the projection 91 is farthest from the rear wall 81, the projection 91 is positioned within the recess portion 92a. Therefore, the sectorial plate 84 can be always tilted in the left-right direction according to the tilting movement of the shift lever 15 in the select direction regardless of the position of the shift lever 15. Since the width of the recess portion 92a is formed larger than the diameter of the projection 91, space 92c is formed between the projection 91 and the engaging portion 92 with respect to the left-right direction (see FIG. 9(b)).

As shown in FIGS. 6, 9(a) and 10, a magnet 93 is mounted on the upper portion of the sectorial plate 84 corresponding to the rear wall 81. The magnet 93 is polarized so that its polarity is changed in the up-down direction. The upper side of the magnet 93 of this embodiment has an N-polarity and the lower side of the magnet 93 has an S-polarity. A substantially sectorial window 83 for the magnet is formed in a portion of the rear wall 81 corresponding to the magnet 93. The magnet 93 is always in the window 83 even when the magnet 93 moves in the left-right direction according to the tilting movement of the sectorial plate 84. The window 83 is surrounded by a rib.

The PC board 95 is mounted on an outer surface of the rear wall 81 so as to cover the window 83. A connecter 98 that is connected to the ECU 110 is mounted on the PC board 95. A cut-away portion 22b is formed in a portion of the sensor cover 22a corresponding to the connector 98 (see FIG. 10).

A third MRE element 96 and a fourth MRE element 97 are arranged on the PC board 95 so as to be aligned with each other in the left-right direction. The third MRE element 96 and the fourth MRE element 97 are sensors for detecting the position of the shift lever 15 in the select direction. Each MRE element 96, 97 detects a change of the magnetic flux that is caused by the movement of the magnet 93 in the left-right direction. The magnet 93 is moved in the left-right direction according to the tilting movement of the shift lever 15 in the select direction. Each MRE element 96, 97 is electrically connected to the connector 98 via a corresponding sensor circuit and outputs three kinds of signals Y1, Y2, Y3 according to the detected magnetic flux. The signals Y1 to Y3 each have a different level. That is, when the shift lever 15 is in the N position or the R position, the MRE element 96, 97 outputs a signal Y1. When the shift lever 15 is in one of the S position, the + position and the − position, the MRE element 96, 97 outputs a signal Y2. When the shift lever 15 is positioned in the S/A position, the MRE Element 96, 97 outputs a signal Y3. In the second embodiment, the voltage value of the signal Y1 is approximately one volt, the voltage value of the signal Y2 is approximately three volts, and the voltage value of the signal Y3 is approximately five volts. An electric source line of the sensor circuit that is connected to the third MRE element 96 is independent from an electric source of the sensor circuit that is connected to the fourth MRE element 97.

In this embodiment, the third MRE element 96 and the fourth MRE element 97 form the second detection device, which detects the position of the shift lever 15 in the select direction.

Figure 11:
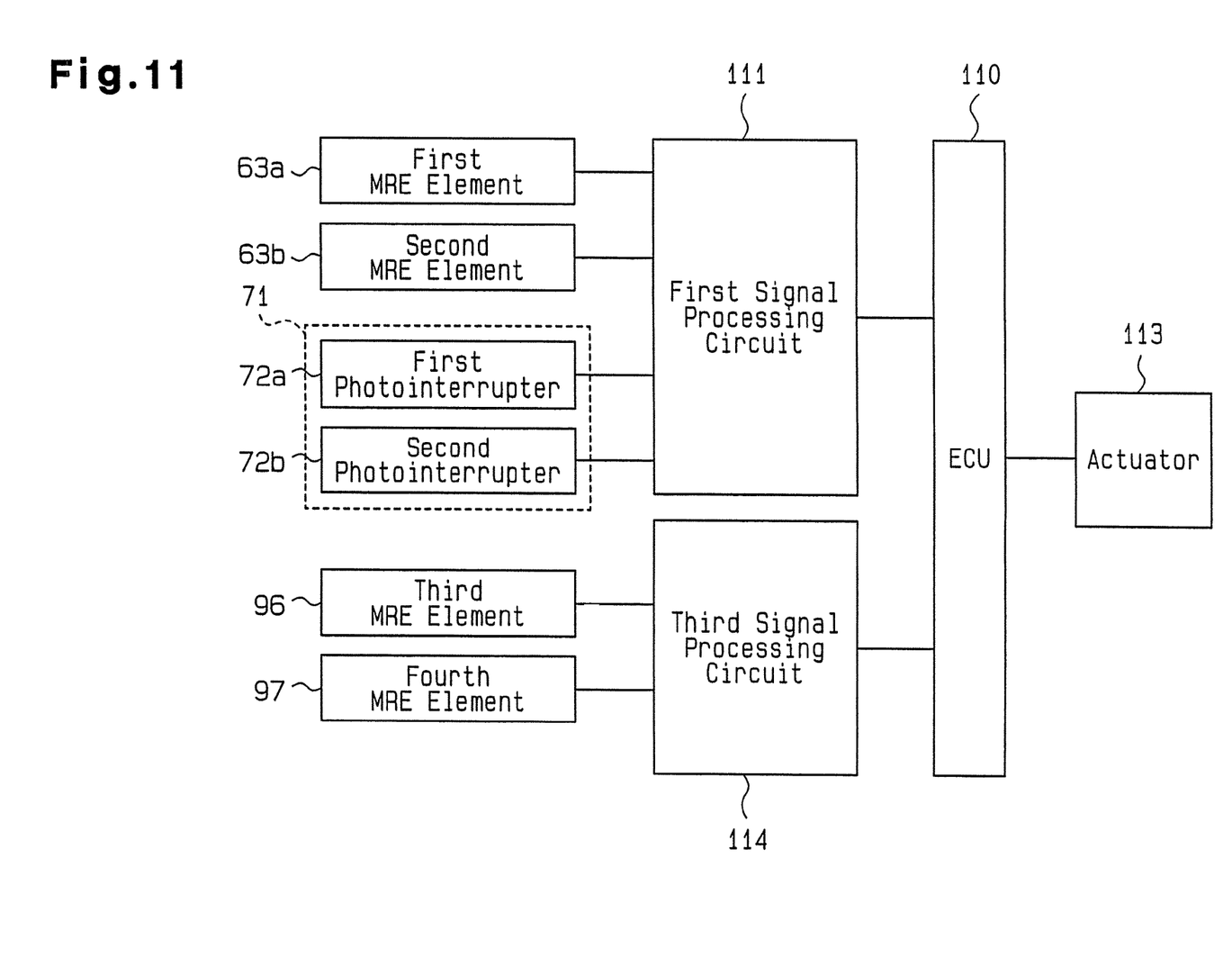
FIG. 11 is a circuit diagram showing paths of signals from the sensor unit to the actuator in the shift device shown in FIG. 6.

As shown in FIG. 11, the output signals Y1 to Y3 of the third MRE element 96 and the output signals Y1 to Y3 of the fourth MRE element 97 are transmitted to a third signal processing circuit 114 having an OR circuit. The third signal processing circuit 114 processes the received signals. The process includes a logical OR operation. The third signal processing circuit 114 outputs the processed result to the ECU 110.

The ECU 110 recognizes the position of the shift lever 15 based on the output signals of the first and third signal processing circuits 111, 114. Accordingly, the ECU 110 operates the actuator 113 for switching the connection state of the transmission.

When the shift lever 15 is moved to the R position, the signal V1 is output from the MRE elements 63a, 63b, the signal W1 is output from the photo-interrupters 72a, 72b, and the signal Y1 is output from the MRE elements 96, 97. As a result, the ECU 110 recognizes that the shift lever 15 is in the R position and switches the connection state of the transmission to the reverse range via the actuator 113.

When the shift lever 15 is moved to the N position, the signal V2 is output from the MRE elements 63a, 63b, the signal W2 is output from the photo-interrupters 72a, 72b, and the signal Y1 is output from the MRE elements 96, 97. As a result, the ECU 110 recognizes that the shift lever 15 is in the N position and switches the connection state of the transmission to the neutral range via the actuator 113.

When the shift lever 15 is moved to the S position, the signal V2 is output from the MRE elements 63a, 63b, the signal W2 is output from the photo-interrupters 72a, 72b, and the signal Y2 is output from the MRE element 96, 97. As a result, the ECU 110 recognizes that the shift lever 15 is in the S position. At this time, the ECU 110 switches the connection state of the transmission to the sequential mode via the actuator 113 when the present connection state of the transmission is in the neutral range. The ECU 110 maintains the present connection state when the present connection state of the transmission is in the sequential mode or the automatic transmission mode.

When the shift lever 15 is moved to the S/A position, the signal V2 is output from the MRE elements 63a, 63b, the signal W2 is output from the photo-interrupters 72a, 72b, and the signal Y3 is output from the MRE elements 96, 97. As a result, the ECU 110 recognizes that the shift lever 15 is in the S/A position. At this time, the ECU 110 switches the connection state of the transmission to the sequential mode via the actuator 113 when the present connection state of the transmission is in the automatic transmission mode. The ECU 110 switches the connection state of the transmission to the automatic transmission mode when the present connection state of the transmission is in the sequential mode.

When the shift lever 15 is moved to the + position, the signal V1 is output from the MRE elements 63a, 63b, the signal W1 is output from the photo-interrupters 72a, 72b, and the signal Y2 is output from the MRE elements 96, 97. As a result, the ECU 110 recognizes that the shift lever 15 is in the + position. At this time, the ECU 110 shifts the transmission to the next higher transmission range when the present connection state of the transmission is in the sequential mode. However, when the present connection state of the transmission is in the automatic transmission mode, the ECU 110 judges that the signals output from the first and third signal processing circuits 111, 114 are invalid and maintains the present connection state.

When the shift lever 15 is moved to the − position, the signal V3 is output from the MRE elements 63a, 63b, the signal W3 is output from the photo-interrupters 72a, 72b, and the signal Y2 is output from the MRE elements 96, 97. As a result, the ECU 110 recognizes that the shift lever 15 is in the − position. At this time, the ECU 110 shifts the transmission to the next lower gear when the present connection state of the transmission is in the sequential mode. However, when the present connection state of the transmission is in the automatic transmission mode, the ECU 110 judges that the signals output from the first and third signal processing circuits 111, 114 are invalid and maintains the present connection state.

According to the second embodiment, the following advantages can be obtained.

The sensors for detecting the position of the shift lever 15 in the shift direction, that are the MRE elements 63a, 63b and the light sensor 71 are unified as the first sensor unit 21. The sensors for detecting the position of the shift lever in the select direction, that are the MRE elements 96, 97, are unified as the second sensor unit 22. Therefore, the structure for detecting the position of the shift lever 15 becomes small in size and the shift device 11 becomes small in size. Since the number of the sensors can be decreased compared to the case where a sensor is arranged on each shift position of the shift lever 15, the shift device 11 becomes inexpensive.

The shift device 11 has the first MRE element 63a, the second MRE element 63b and the light sensor 71 as a sensor for detecting the position of the shift lever 15 in the shift direction. Therefore, even if any one of the three sensors malfunctions, the position of the shift lever 15 in the shift direction can be detected by the other sensors.

The shift device 11 has the third MRE element 96 and the fourth MRE element 97 as a sensor for detecting the position of the shift lever 15 in the select direction. Therefore, even if one of the two sensors malfunctions, the position of the shift lever 15 in the select direction can be detected by the another sensor.

Since the space 92c is formed between the projection 91 and the engaging portion 92, it is prevented that the sectorial plate 84 is tilted unintentionally in the front-rear direction by the vibration of the shift lever 15 that is caused when the vehicle is running. Since the operation of the sectorial plate 84 is stable with respect to the vibration of the shift lever 15, the detection accuracy of the MRE element 96, 97 is increased.

Since the MRE elements 63a, 63b, the light sensor 71 and the MRE elements 96, 97 are non-contact sensors, their durability is excellent.

The first sensor unit 21 is arranged outside of the housing 12. The PC board that is a main portion of the second sensor unit 22 is arranged outside of the housing 12. Therefore, the maintenance and the replacement of the sensors can be executed simply compared to the case where the first sensor unit 21 and the PC board 95 are arranged inside of the housing 12.

It should be apparent to those skilled in the art that the present invention may be embodied in many other specific forms without departing from the spirit or scope of the invention. Particularly, it should be understood that the invention may be embodied in the following forms.

In the first and second embodiments, the case 53 may be omitted and the PC board 55, the sectorial plate 61 and other parts may be accommodated directly in the arrangement recess portion 52 instead.

In the first and second embodiments, the arrangement recess portion 52 may be omitted and the case 53 may be directly arranged on the right side wall 50 of the housing 12.

In the first embodiment, the sensor unit 20 need not be arranged outside of the housing 12 but may be arranged inside of the housing 12. When the sensor unit 20 is arranged inside of the housing 12, the magnet 62 need not be arranged on the shaft 24 but may be arranged on the retainer 23. In the second embodiment, the first sensor unit 21 need not be arranged outside of the housing 12 but may be arranged inside of the housing 12. When the first sensor unit 21 is arranged inside of the housing 12, the magnet 62 need not be arranged on the shaft 24 but may be arranged on the retainer 23.

In the second embodiment, the PC board 95 need not be arranged outside of the housing 12 but may be arranged inside of the housing 12.

In the first embodiment, the sensor unit 20 need not be arranged on the right side wall 50 of the housing 12 but may be arranged on the left side wall of the housing 12. In the second embodiment, the first sensor unit 21 need not be arranged on the right side wall 50 of the housing 12 but may be arranged on the left side wall of the housing 12, the second sensor unit 22 need not be arranged on the rear wall 81 of the housing 12 but may be arranged on the front wall of the housing 12.

In the first and the second embodiments, one of the MRE elements 63a, 63b and the light sensor 71 may be omitted. Other than the MRE elements 63a, 63b and the light sensor 71, the shift device 11 may include another sensor for detecting the position of the shift lever 15 in the shift direction.

In the first and the second embodiments, one of the first MRE element 63a and the second MRE element 63b may be omitted. Other than the MRE elements 63a, 63b, the shift device 11 may include another MRE element for detecting the position of the shift lever in the shift direction.

In the first embodiment, other than the microswitches 73, 74, the shift device 11 may include another sensor for detecting the position of the shift lever 15 in the select direction.

In the first embodiment, one of the first microswitch 73 and the second microswitch 74 may be omitted. Other than the microswitches 73, 74, the shift device 11 may include another sensor for detecting the position of the shift lever 15 in the select direction.

In the second embodiment, other than the MRE elements 96, 97, the shift device 11 may include another sensor for detecting the position of the shift lever 15 in the select direction.

In the second embodiment, one of the third MRE element 96 and the fourth MRE element 97 may be omitted. Other than the MRE elements 96, 97, the shift device 11 may include another MRE element for detecting the position of the shift lever 15 in the select direction.

In the first and the second embodiments, instead of the MRE elements 63a, 63b and the light sensor 71, other non-contact sensor may be used. For example, a Hall element may be used for the MRE elements 63a, 63b.

In the second embodiment, instead of the MRE elements 96, 97, other non-contact sensor may be used. For example, a Hall element may be used for the MRE elements 96, 97.

In the second embodiment, a shock absorbing member such as rubber or sponge may be arranged on the inner surface 92b of the engaging portion 92 or the surface of the projection 91. Or at least one of the projection 91 and the engaging portion 92 may be formed of the shock absorbing member such as rubber. Accordingly, the shock caused when the projection 91 contacts the engaging portion 92 is weakened and the operation of the sectorial plate 84 becomes stable. This increases the detection accuracy of the MRE elements 96, 97. In case of this modification, the space 92c between the projection 91 and the engaging portion 92 is smaller than the case of the second embodiment. Or the space 92c between the projection 91 and the engaging portion 92 need not be necessary in this modification.

In the second embodiment, the shape of the engaging portion 92 may be changed. For example, the two plate members extending in the up-down direction may face with each other with holding the projection 91 therebetween.

In the first and the second embodiments, the shaft 24 need not extend in the left-right direction but may extend in the front-rear direction. The pin 25 need not extend in the front-rear direction but may extend in the left-right direction. However, in this modification according to the first embodiment, the sensor unit 20 is arranged on the front wall or the rear wall of the housing 12. In this modification according to the second embodiment, the first sensor unit 21 is arranged on the front wall or the rear wall of the housing 12 and the second sensor unit 22 is arranged on the left side wall or the right side wall of the housing 12.

In the first and the second embodiments, the shift lock device 45 may make impossible the operation of the shift lever 15 that is in a position other than the R position, for example in the S position. The shift lock device 45 may have a different mechanism such as a mechanism having a solenoid for pushing out a plunger so as to restrict the movement of the shift lever 15.

In the first and the second embodiments, the shape of the shift gate 14 may be changed.

In the first and the second embodiments, the shift device need not be arranged on the floor console F but may be arranged on an instrument panel or a steering column.

Therefore, the present examples and embodiments are to be considered as illustrative and not restrictive and the invention is not to be limited to the details given herein, but may be modified within the scope and equivalence of the appended claims.

What is claimed is:

1. A shift device comprising:
    a housing;
    a shift member extending from the housing, wherein the shift member is moved in a first direction and a second direction for selecting the connection state of the transmission of a vehicle, the first and second directions intersecting each other;
    a moving member, wherein the moving member moves substantially in the second direction in accordance with movement of the shift member in the second direction; and
    a sensor unit attached to the housing, wherein the sensor unit is formed by integrating a first detection device and a second detection device, wherein the first detection device detects the position of the shift member in the first direction, and wherein the second detection device detects the movement position of the moving member,
    wherein the second detection device comprises a micro-switch including a lever that is actuated in accordance with a movement position of the moving member, the micro-switch selectively outputs one of two different signals in accordance with whether the lever is depressed halfway or completely.

2. The shift device according to claim 1, further comprising a rotation member, wherein, in accordance with movement of the shift member in the first direction, the rotation member rotates about an axis parallel to the second direction, and wherein the first detection device detects the rotation position of the rotation member.

3. The shift device according to claim 2, wherein the housing has a mounting surface to which the sensor unit is mounted, and wherein the mounting surface intersects the second direction.

4. The shift device according to claim 1, wherein the first detection device includes a plurality of sensors for detecting the position of the shift member in the first direction.

5. The shift device according to claim 4, further comprising:
    a signal processing circuit that receives output signals of the first detection device, wherein the signal processing circuit includes an OR-circuit, wherein the signal processing circuit processes the output signals from the first detection device, the process including a logical OR operation; and
    a control device that receives output signals of the signal processing circuit, wherein, based on the output signals of the signal processing circuit, the control device recognizes the position of the shift member in the first direction.

6. The shift device according to claim 1, wherein the second detection device includes a plurality of sensors for detecting the position of the shift member in the second direction.

7. The shift device according to claim 6, further comprising:
    a signal processing circuit that receives output signals of the second detection device, wherein the signal processing circuit includes an OR-circuit, wherein the signal processing circuit processes the output signals from the second detection device, the process including a logical OR operation; and
    a control device that receives output signals of the signal processing circuit, wherein, based on the output signals of the signal processing circuit, the control device recognizes the position of the shift member in the second direction.

8. A shift device comprising:
    a housing;
    a shift member extending from the housing, wherein the shift member is moved in a first direction and a second direction for selecting the connection state of the transmission of a vehicle, the first and second directions intersecting each other;
    a shaft extending in the second direction, wherein, in accordance with movement of the shift member in the first direction, the shaft rotates about an axis parallel to the second direction;
    a projection extending in the second direction, wherein the projection moves substantially in the second direction in accordance with movement of the shift member in the second direction; and
    a sensor unit attached to the housing, wherein the sensor unit is formed by integrating a first detection device and a second detection device, wherein the first detection device detects the rotation position of the shaft, and wherein the second detection device detects the movement position of the projection;
    wherein the first detection device comprises a non-constant sensor, the sensor selectively outputs one of a plurality of different signals in accordance with the rotation position of the rotation position; and
    wherein the second detection device comprises a micro-switch including a lever that is actuated in accordance with movement position of the projection, the micro-switch selectively outputs one of two different signals in accordance with whether the lever is depressed halfway or completely.

9. The shift device according to claim 8, wherein the non-contact sensor is a magneto-resistive effect element.

10. The shift device according to claim 8, wherein the non-contact sensor is a light sensor.

* * * * *